J. JAMISON
Jacket-Stretcher for Paper-Machines.

No. 225,609. Patented Mar. 16, 1880.

United States Patent Office.

JOHN JAMISON, OF TURNER'S FALLS, MASSACHUSETTS.

JACKET-STRETCHER FOR PAPER-MACHINES.

SPECIFICATION forming part of Letters Patent No. 225,609, dated March 16, 1880.

Application filed January 31, 1880.

*To all whom it may concern:*

Be it known that I, JOHN JAMISON, of Turner's Falls, in the county of Franklin and Commonwealth of Massachusetts, have invented a new and useful Jacket-Stretcher for Paper-Machines, of which the following is a true and full specification.

My invention relates to a machine used especially in paper-mills for stretching the felt or woven coverings called "jackets," which are drawn over cylinders in use in Fourdrinier paper-machines to cover them closely.

It is well known to those familiar with paper-making that what are called "jackets" are made of heavy cloth or felt woven or made without a seam, and a little larger than the cylinders which they are intended to cover for use, and drawn on, usually from thirteen to fifteen or more inches in diameter, and in length running as high as ninety-two inches; and it is a matter of considerable difficulty to stretch them so that they can be drawn over the cylinders without tearing, and then to shrink them tightly to place by the application of hot water. Various devices have been used to accomplish this; but they have been unhandy and clumsy, requiring much time and continued trials before securing a fit, and sometimes tearing the cloth, and never producing a uniform extension from the one end to the other.

My device stretches the jacket uniformly for its whole length at one operation, easily, accurately, and without danger of tearing the cloth.

Figure 1:
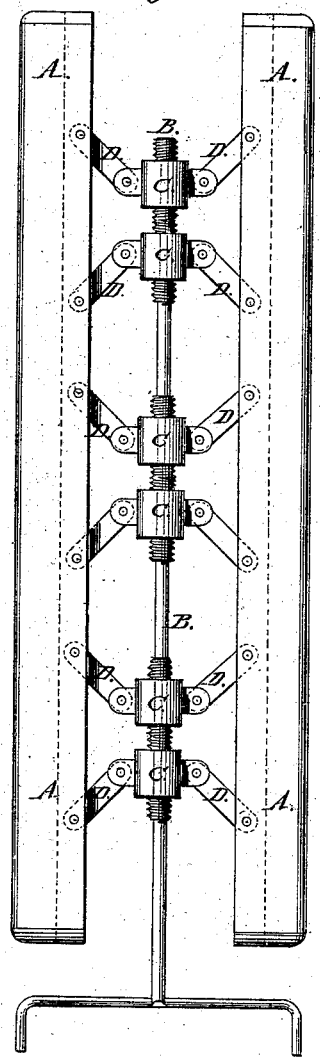
Figure 2:
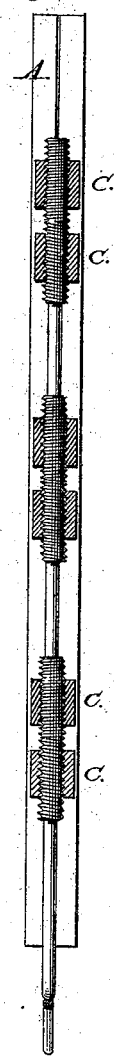

The accompanying drawings represent the machine by which I accomplish this, Figure 1 being a plan view, and Fig. 2 a longitudinal section.

It consists of two parallel bars, A A, of sufficient length to fit the longest jacket required, and strong enough to spread it with the necessary applied pressure. These bars, rounded on the outer side, are slotted on the inner side to receive the ends of short flat links or levers D D, which are fastened therein by rivets or pivots, which allow them to move to and fro longitudinally. The other ends of these levers are pivoted on lugs projecting from and forming parts of a series of nuts having on their insides threads cut, through all of which runs longitudinally a rod, B, having cut on it a series of right-and-left screws, which run in threads cut inside the nuts C C. These nuts are in pairs, one near each end and one pair in the middle; or more may be used, if ever necessary, and work on the screws on the rod.

When the two nuts of each pair are closed together the division between the right and the left hand thread of the screw is exactly in the center between them, and the levers, pivoted as they are, or in each lug, or either side of each nut, stand bracing out from the nuts in opposite directions. Now, as the rod having a crank on its end is turned to the right, the right-and-left screws engage respectively in the nuts, drawing them apart, and, consequently, straightening up the levers right and left, and firmly but steadily spreading the bars uniformly and at every point on their whole length.

A pin or check-nut may be placed on the end of the rod, which shall stop the spreading at a precise point of the circumference of the cylinder to be covered.

The operation is simple. The bars, extended to nearly the necessary width, are thrust through the jacket. The rod is then turned, the screws and nuts extend the levers, and the bars are spread. The jacket is wetted with cold water to make it yield. It is stretched to the size indicated by measuring the circumference of the cylinder and around the bars—a little larger than the cylinder. It is allowed to dry, the tension of the bars relaxed, the jacket transferred from these to the cylinder, and, wetted with hot water, shrinks tightly in position.

What I claim, and desire to secure by Letters Patent, in a jacket-stretcher, is—

The combination of the parallel bars and the levers with the nuts working on a rod with right and left hand screws, all substantially as described and shown.

JOHN JAMISON.

Witnesses:
JAMES S. GRINNELL,
WM. H. ALLEN.